US008090715B2

(12) United States Patent
Matias

(10) Patent No.: US 8,090,715 B2
(45) Date of Patent: Jan. 3, 2012

(54) METHOD AND SYSTEM FOR DYNAMICALLY GENERATING A SEARCH RESULT

(75) Inventor: Joven Michael Matias, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 403 days.

(21) Appl. No.: 12/218,358

(22) Filed: Jul. 14, 2008

(65) Prior Publication Data

US 2010/0010984 A1 Jan. 14, 2010

(51) Int. Cl.
*G06F 7/00* (2006.01)
(52) U.S. Cl. ........................................ 707/726; 707/765
(58) Field of Classification Search .................. None
See application file for complete search history.

(56) References Cited

U.S. PATENT DOCUMENTS

| | | | |
|---|---|---|---|
| 2002/0024532 A1* | 2/2002 | Fables et al. ................. | 345/700 |
| 2002/0091661 A1 | 7/2002 | Anick et al. | |
| 2007/0162443 A1* | 7/2007 | Liu et al. ..................... | 707/5 |
| 2007/0250498 A1 | 10/2007 | Pedersen et al. | |
| 2007/0255755 A1 | 11/2007 | Zhang et al. | |
| 2008/0162433 A1 | 7/2008 | Wolf | |

FOREIGN PATENT DOCUMENTS

WO 00/70502 11/2000

* cited by examiner

*Primary Examiner* — Vei-Chung Liang
(74) *Attorney, Agent, or Firm* — Farjami & Farjami LLP

(57) ABSTRACT

There is provided a method for dynamically generating search results from a dataset. The method comprises receiving a first search keyword from a user and searching for a first content object that is identified by the first search keyword. The method further comprises building a metadata pool using metadata associated with the first content object. Furthermore, the method comprises selecting a second search keyword from the metadata pool, and searching for a second content object by substituting the second search keyword for the first search keyword. If a first content object is not identified by the first search keyword, then the method may terminate. In one embodiment, the selection of the second search keyword from the metadata pool comprises making a random selection of the second search keyword.

18 Claims, 3 Drawing Sheets

METHOD AND SYSTEM FOR DYNAMICALLY GENERATING A SEARCH RESULT

BACKGROUND OF THE INVENTION

1. Field of the Invention

The present invention is generally in the field of computer search methods and systems. More particularly, the present invention relates to computer search engines.

2. Background Art

The art of searching datasets, such as collections of media files, has progressed rapidly with the advent of widespread computerization. For example, the development of database software and Internet searching software has progressed steadily over the past several decades, thereby contributing significantly to the art of search methods and systems. Thus, using conventional search methods and systems, datasets in various forms can be quickly and efficiently searched. Conventional static keyword searches, in particular, are frequently utilized to find in a dataset data that is relevant to a keyword fairly effectively.

Unfortunately, conventional search methods and systems, such as those implementing static keyword searches, suffer from various drawbacks. For example, static keyword searches, while fairly effective for some purposes, tend to produce rigidly ranked search results that, while repeatable, often ignore or obscure search results that are ranked slightly lower by the static keyword search. The search results may be ranked according to, for example, a relevance formula that discounts certain search results that a user of the static keyword search may actually be interested in. Another drawback of static keyword searches is that a user must artfully choose a proper keyword to find data he is looking for. Thus, if the user performs a static keyword search while utilizing a non-optimally chosen keyword, the search results may not contain the desired data. Altogether, static keyword searches too often produce search results that either hide desired search results or fail to locate desired results altogether.

Accordingly, there is a need to overcome the drawbacks and deficiencies in the art by providing search engines that can locate desired search results more efficiently and in less time.

SUMMARY OF THE INVENTION

There are provided methods and systems for dynamically generating a search result, substantially as shown in and/or described in connection with at least one of the figures, and as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to a method and system for dynamically generating a search result. Although the invention is described with respect to specific embodiments, the principles of the invention, as defined by the claims appended herein, can obviously be applied beyond the specific embodiments of the invention described herein. Moreover, in the description of the present invention, certain details have been left out in order to not obscure the inventive aspects of the invention. The details left out are within the knowledge of a person of ordinary skill in the art. The drawings in the present application and their accompanying detailed description are directed to merely exemplary embodiments of the invention. To maintain brevity, other embodiments of the invention, which use the principles of the present invention are not specifically described in the present application and are not specifically illustrated by the present drawings.

Figure 1A:
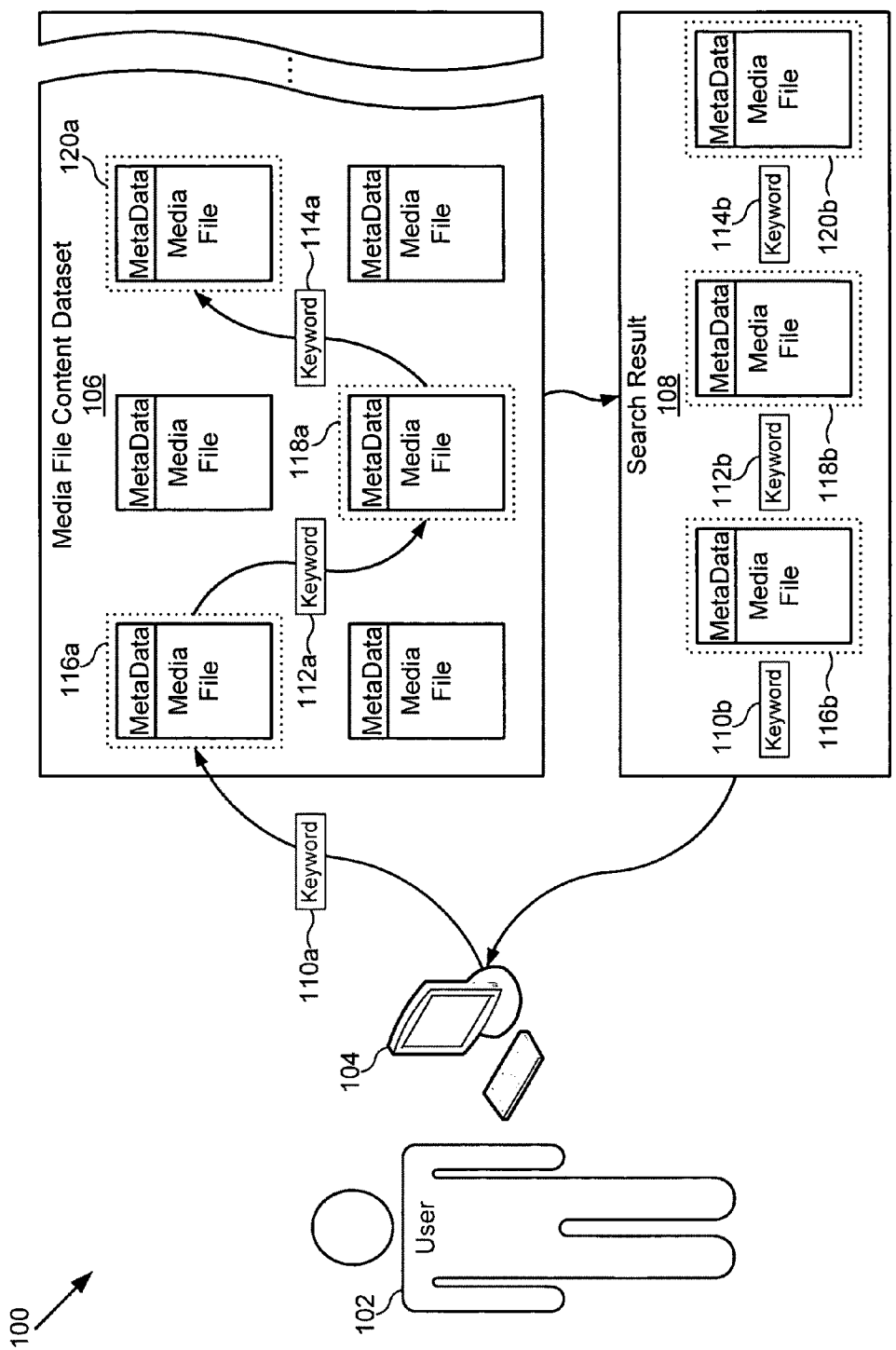
FIG. 1a shows a diagram of an exemplary system for dynamically generating a search result, according to one embodiment of the present invention.

FIG. 1a shows exemplary system 100 for dynamically generating search results 108, according to one embodiment of the present invention. Search results 108 reveals desired data in media file content dataset 106, and may also mimic the train of thought of user 102 by displaying results according to the order of search, as discussed further below. System 100 comprises computing device 104 configured for utilization by user 102. Computing device 104 is, in one embodiment, a personal computer or PDA comprising a processor, memory, output display screen, input keyboard, and interface coupled to the Internet. In one embodiment, media file content dataset 106 (hereinafter "dataset 106") and search results 108 are stored in the memory of computing device 104. In another embodiment dataset 106, search results 108, or both could be stored on, for example, an external storage system such as a local or a networked hard drive, coupled to computing device 104 via, for example, a local connection or the Internet. Computing device 104 is configured to receive first search keyword 110a from user 102 prior to dynamically generating search results 108, according to the invention, and is further configured to display search results 108 to user 102.

In one embodiment of the invention, dataset 106 is a collection of media files and associated metadata. For example, first content object 116a comprises a media file and associated first metadata. In one embodiment, the media file of first content object 116a is an audiovisual recording of a television show. In other embodiments, the media file may be a movie, a still picture, an audio recording, or even character or binary data. The associated first metadata of first content object 116a is, in one embodiment, data about the media file of first content object 116a. Thus, in an embodiment in which the media file is an audiovisual recording of a television show, the associated first metadata may comprise, for example, a title, a show description, an airdate, and a television rating about the television show. In other embodiments, the associated first metadata generally comprises data about or relevant to the media file. Second content object 118a and third content object 120a also each comprise a media file and associated second and third metadata. Altogether, dataset 106 comprises first, second, and third content objects 116a, 118a, 120a, and additional content objects as shown in FIG. 1a.

In operation, in one embodiment system 100 begins dynamically generating search results 108 when computing device 104 receives first search keyword 110a from user 102. User 102 may select first search keyword 110a from various sources, or for various reasons. For example, in one embodiment, user 102 may not know what dataset 106 contains, and may thus choose first search keyword 110a to have a generic or commonplace meaning, to dynamically generate search results 108 to contain a broad set of results. In another embodiment, user 102 may know, for example, exactly which contents objects are in dataset 106, and may select first search keyword 110a with the intent of generating search results 108 containing a particular desired content object.

After user 102 selects first search keyword 110a and enters first search keyword 110a into computing device 104, system 100 proceeds to dynamically generate search results 108 by searching for a content object that is identified by first search keyword 110a. In one embodiment, a content object is identified by first search keyword 110a when the content object is more relevant to first search keyword 110a than any other content object in dataset 106. A content object might be most relevant, and thus identified when, for example, the associated metadata of the content object textually matches first search keyword 110a. In another embodiment of the present invention, a content object might be identified by first search keyword 110a when the content object only partially textually matches first search keyword 110a (e.g., through the use of wildcard characters). If no content object of dataset 106 is identified by first search keyword 110a, search results 108 is returned, in one embodiment, as an empty search result. As shown in system 100, first search keyword 110a in one example identifies first content object 116a.

In one embodiment in which first search keyword 110a identifies first content object 116a, first content object 116a is added to search results 108. First content object 116a can be added to search results 108 by, for example, creating a link to first content object 116a of dataset 106 in search results 108, or, for example, copying first content object 116a of dataset 106 into search results 108, as known in the art. FIG. 1a shows first content object 116a copied into search results 108 as first content object 116b. In one embodiment, first search keyword 110a is also copied into search results 108 as first search keyword 110b. By copying both first search keyword 110a and identified first content object 116a into search results 108, the train of thought of user 102 is better mimicked than if only first content object 116a is so copied. In one embodiment, search results 108 is contemporaneously displayed to user 102.

After identifying first content object 116a, in one embodiment system 100 continues the dynamic generation of search results 108 by selecting second search keyword 112a. Second search keyword 112a is selected after performing several operations on associated first metadata of first content object 116a. In particular, the first metadata associated with first content object 116a can, in one embodiment, be combined into a metadata pool, thereby building a metadata pool. For example, as mentioned above the media file of first content object 116a may be an audiovisual recording of a television show, and the associated first metadata comprises the title, show description, airdate, and television rating of the television show. In such an embodiment, the associated first metadata can be combined into a metadata pool by, for example, reformatting the title, show description, airdate, television rating, and other metadata into a text string.

After performing this combining operation on the associated first metadata of first content object 116a to build the metadata pool, the selection of second search keyword 112a can continue, in one embodiment, by building a keyword pool by extracting at least one term from the metadata pool. The extraction of at least one term from the metadata pool can be accomplished in a customized manner by, for example, weighting terms in the metadata pool according to a preference of user 102. In one embodiment, for example, terms can be extracted from the metadata pool into the keyword pool according to whether each term has been the focus of a previous search performed by user 102. Once the keyword pool is populated with at least one term from the metadata pool, second search keyword 112a is selected from the keyword pool by, for example, making a random selection of second search keyword 112a from the keyword pool. It should be understood that rather than creating the keyword pool, in one embodiment, the metadata pool may be modified, as described above, to further function as the keyword pool. Yet, in other embodiments, after the creation of the metadata pool, without any further modifications, can function as the keyword pool.

After second search keyword 112a is selected from the keyword pool built by performing several operations on the associated first metadata of first content object 116a as described above, system 100 continues dynamically generating search results 108 by searching for a content object that is identified by second search keyword 112a. A content object is identified by second search keyword 112a in the same manner that first content object 116a was identified by first search keyword 110a. For example, a content object might be identified by second search keyword 112a when the content object only partially textually matches second search keyword 112a. If no content object of dataset 106 is identified by second search keyword 112a, search results 108 is returned and displayed, in one embodiment, as a search result containing only first search keyword 110b and first content object 116b. As shown in FIG. 1a, however, second search keyword 112a in one example identifies second content object 118a. Second content object 118a is added to search results 108 in a manner similar to first content object 116a by, for example, creating a link to or copying second content object 118a as known in the art. FIG. 1a shows second content object 118a copied into search results 108 as second content object 118b. In one embodiment, second search keyword 112a is also copied into search results 108 as second search keyword 112b.

After identifying second content object 118a, in one embodiment system 100 continues the dynamic generation of search results 108 by selecting third search keyword 114a. Third search keyword 114a is selected in a manner similar to second search keyword 112a, by performing several operations on associated second metadata of second content object 118a. In particular, the second metadata associated with second content object 118a can be combined into a metadata pool by, for example, reformatting title, show description, airdate, and television rating metadata into a text string. The second metadata associated with second content object 118a may, for example, be added to or may instead, for example, replace the metadata pool built utilizing the first metadata associated with first content object 116a. After performing this combining operation on the associated second metadata of second content object 118a, the selection of third search keyword 114a can continue by building a keyword pool by extracting at least one term from the metadata pool. The extraction of at least one term from the metadata pool can be accomplished in a customized manner by, for example, weighting terms in the metadata pool according to a preference of user 102. Once the keyword pool is populated with at least one term from the metadata pool, third search keyword 114a is selected from the keyword pool by, for example, making a random selection of third search keyword 114a from the keyword pool.

After third search keyword 114a is selected from the keyword pool generated by performing several operations on the associated second metadata of second content object 118a as described above, system 100 continues dynamically generating search results 108 by searching for a content object that is identified by third search keyword 114a. Third content object 120a is identified by third search keyword 114a in the same manner that first and second content objects 116a and 118a were identified as discussed above. Subsequently, after building a metadata pool and keyword pool from third content object 120a in the manner discussed above, no new keyword is selected from the keyword pool because, for example, the keyword pool is empty or because, for example, system 100 is configured to produce search results 108 having a maximum length of 3 results. Third content object 120a is thus copied to search results 108 as third content object 120b, and third search keyword 114a may also be copied into search results 108 as third search keyword 114b, as shown in FIG. 1a. Search results 108, is then provided and displayed according to the order of search to user 102 via the display screen of computing device 104.

Figure 1B:
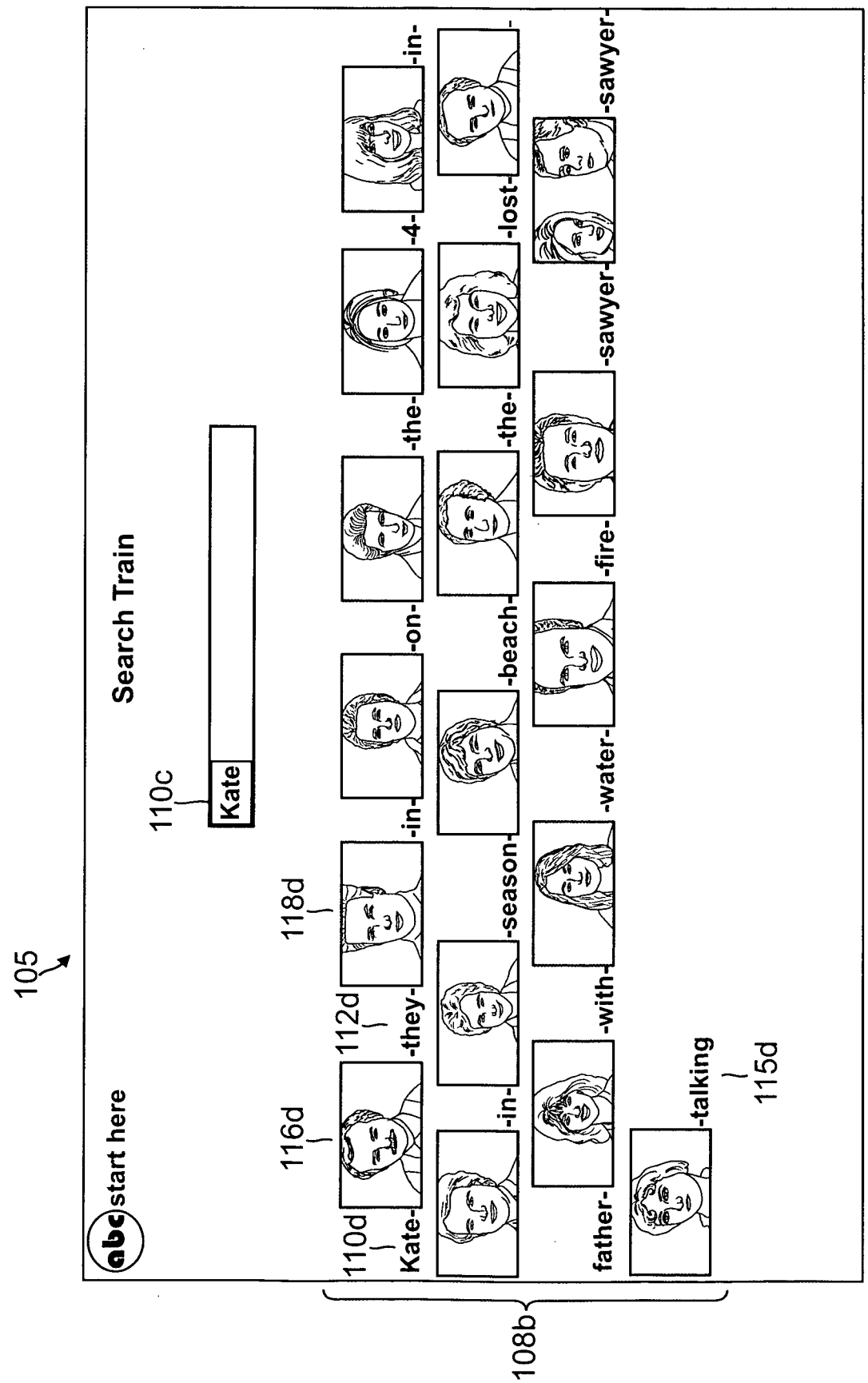
FIG. 1b shows a diagram of an exemplary search, according to one embodiment of the present invention.

FIG. 1b shows a diagram of an exemplary search according to one embodiment of the present invention. In particular, display screen 105, which corresponds, for example, to the display screen of computing device 104 in FIG. 1a, shows first search keyword 110c ("kate") and search results 108b. First search keyword 110c corresponds to first search keyword 110a in FIG. 1a, and is a search keyword entered by a user, for example user 102. Search results 108b corresponds to search results 108 in FIG. 1a, and comprises a series, or train, of search keywords and content objects, mimicking a train of thought, starting with first search keyword 110d and ending with keyword 115d. First search keyword 110d and first content object 116d correspond to, for example, first search keyword 110b and first content object 116b in FIG. 1a.

In FIG. 1b, search results 108b is dynamically generated in a manner corresponding to search results 108 discussed above. In particular, user 102 enters "kate" as first search keyword 110c using the input of a computer corresponding to computing device 104. The computer then dynamically generates search results 108b according to one embodiment of the present invention by performing a search on a dataset of, for example, episodes of the television show "Lost," corresponding to media file content dataset 106. In particular, in search results 108b, first search keyword 110d, "kate," identifies an episode (displayed as a screenshot) shown as first content object 116d. Subsequently, a second search keyword 112d, "they," is selected from a metadata pool built utilizing first metadata associated to first content object 116d. The second search keyword 112d, "they" identifies an episode (also displayed as a screenshot) shown as second content object 118d. In this manner, a series of search keywords (e.g. "in," "on," "the," etc.) and content objects (shown as screenshots) are returned and displayed, terminating with keyword 115d, "talking," which does not identify another episode. After generating search results 108b, search results 108b is provided and displayed according to the order of search, as shown in FIG. 1b, to the user via display screen 105 of the computer.

Figure 2:
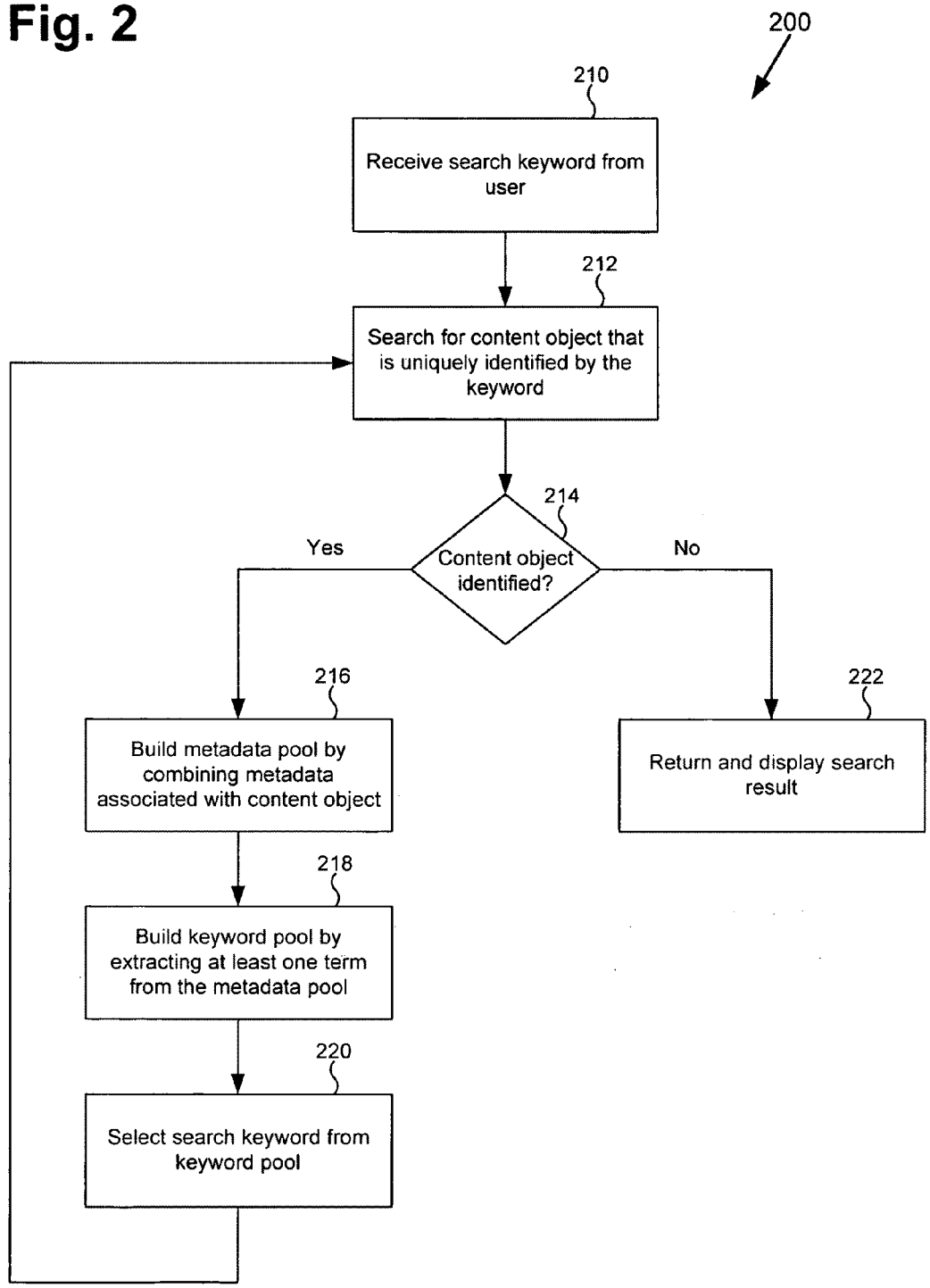
FIG. 2 shows a flowchart presenting an exemplary method for dynamically generating a search result, according to one embodiment of the present invention.

FIG. 2 shows flowchart 200 of an exemplary method for dynamically generating a search result, according to one embodiment of the present invention. Certain details and features have been left out of flowchart 200 that are apparent to a person of ordinary skill in the art. For example, a step may comprise one or more substeps or may involve specialized equipment or materials, as known in the art. While steps 210 through 222 indicated in flowchart 200 are sufficient to describe one embodiment of the present invention, other embodiments of the invention may utilize steps different from those shown in flowchart 200.

In step 210 of flowchart 200, a keyword is received from a user utilizing a computer to perform a method for dynamically generating a search result. The keyword, user, and computer all correspond, in one embodiment, to first search keyword 110a, user 102, and computing device 104 in FIG. 1a. Thus, the user may choose the keyword to have a generic or commonplace meaning if the method is being performed with a dataset, corresponding to dataset 106, that is, for example, unfamiliar to the user. In another embodiment, the user may know which contents objects are in the dataset and may select the keyword with the intent, for example, of generating a search result containing a particular content object.

In step 212 of flowchart 200, a content object that is identified by the keyword is searched for. A content object may be identified by the keyword when, in one embodiment, the content object is more relevant to the keyword than any other content object in the dataset. The content object might be most relevant, and thus identified when, for example, associated metadata of the content object has an exact or partial textual match with the keyword. If no content object of the dataset is identified by the keyword, flowchart 200 progresses to step 222 from step 212 via step 214, but otherwise flowchart 200 progresses to step 216 via step 214, as shown in FIG. 2.

In step 216, which flowchart 200 arrives at after the keyword identifies a content object, a metadata pool is built by combining metadata associated to the content object. For example, if a media file of the content object is an audiovisual recording of a television show, and the associated metadata of the content object comprises the title, description, airdate, and television rating of the television show, then the associated metadata can be combined into a metadata pool by, for example, reformatting the title, description, airdate, television rating, and other metadata into a text string. Having built a metadata pool, flowchart 200 progresses to step 218, in which a keyword pool is built by extracting at least one term from the metadata pool. The extraction of at least one term from the metadata pool can be accomplished in a customized manner by, for example, weighting terms in the metadata pool according to a preference of the user. In one embodiment, for example, terms can be extracted from the metadata pool into the keyword pool according to whether each term has been the keyword in a previous search performed by the user. After building the keyword pool, flowchart 200 progresses to step 220.

In step 220 of flowchart 200, a new keyword is selected from the keyword pool. The new keyword is selected, in one embodiment, by making a random selection from the keyword pool. Flowchart 200 progresses by repeating step 212, while substituting the new keyword for the search keyword. Thus, the dynamic generation of the search result can be repeated. If a second content object is found after repeating step 212, flowchart 200 progresses to step 222 via step 214. Otherwise, in step 222, the search result, including all content objects found (if any), is returned to the user.

In the manner described above, the invention as shown in exemplary system 100 and exemplary flowchart 200 dynamically generates a search result and overcomes the drawbacks of conventional solutions. The invention avoids the production of rigidly ranked search results that may ignore or obscure desired search results. Additionally, the invention avoids requiring the user to artfully choose a proper keyword to find data he is looking for. Altogether, the invention can, for example, dynamically generate search results that reveal desired data and mimic the user's train of thought.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for dynamically generating search results from a dataset, the method comprising:
   receiving a first search keyword from a user;
   searching for a first content object in the dataset using the first search keyword, the first content object having first metadata portion separate from and associated with a first audiovisual portion of the first content object;
   identifying the first content object in the dataset using the first search keyword;
   displaying the first content object as the search results;
   retrieving the first metadata associated with the first audiovisual portion of the first content object;
   building a metadata pool using the first metadata associated with the first audiovisual portion of the first content object;
   selecting a second search keyword from the metadata pool;
   searching for a second content object in the dataset using the second search keyword, the second content object having second metadata portion separate from and associated with a second audiovisual portion of the second content object;
   identifying the second content object in the dataset using the second search keyword;
   displaying the second content object as the search results;
   retrieving the second metadata associated with the second audiovisual portion of the second content object; and
   building the metadata pool using the second metadata associated with the second audiovisual portion of the second content object;
   wherein the displaying the first content object as the search results includes displaying the first search keyword in conjunction with a first visual object indicative of the first audiovisual portion, and wherein the displaying the second content object as the search results includes displaying the second search keyword in conjunction with a second visual object indicative of the second audiovisual portion.

2. The method of claim 1, wherein the building the metadata pool using the second metadata includes adding the second metadata to the metadata pool having the first metadata.

3. The method of claim 1, wherein the building the metadata pool using the second metadata includes replacing the first metadata in the metadata pool having the first metadata with the second metadata.

4. The method of claim 1, wherein the identifying the first content object in the dataset using the first search keyword includes text matching the first search keyword to the first metadata associated with the first content object.

5. The method of claim 1, wherein the building the metadata pool comprises generating a string of data associated with the first content object.

6. The method of claim 1, wherein the building the metadata pool comprises building a keyword pool based on a preference of the user.

7. The method of claim 6, wherein the selecting the second search keyword comprises making a random selection of the second search keyword from the keyword pool.

8. The method of claim 1, wherein the selecting the second search keyword comprises making a random selection of the second search keyword from the metadata pool.

9. A system configured to dynamically generate search results from a dataset, the system comprising:
   an input configured to receive a first search keyword;
   a memory configured to store the search results; and
   a processor configured to:
      receive the first search keyword from a user via the input;
      search for a first content object in the dataset using the first search keyword, the first content object having first metadata portion separate from and associated with a first audiovisual portion of the first content object;
      identify the first content object in the dataset using the first search keyword;
      display the first content object as the search results,
      retrieve the first metadata associated with the first audiovisual portion of the first content object;
      build a metadata pool using the first metadata associated with the first audiovisual portion of the first content object;
      select a second search keyword from the metadata pool;
      search for a second content object in the dataset using the second search keyword, the second content object having second metadata portion separate from and associated with a second audiovisual portion of the second content object;
      identify the second content object in the dataset using the second search keyword;
      display the second content object as the search results;
      retrieve the second metadata associated with the second audiovisual portion of the second content object; and
      build the metadata pool using the second metadata associated with the second audiovisual portion of the second content object;
      wherein displaying of the first content object as the search results includes displaying the first search keyword in conjunction with a first visual object indicative of the first audiovisual portion, and wherein displaying of the second content object as the search results includes displaying the second search keyword in conjunction with a second visual object indicative of the second audiovisual portion.

10. The system of claim 9, wherein the first metadata are about the first audiovisual portion of the first content object, including at least one of a show description, an airdate and a television rating.

11. The system of claim 10, wherein the building of the metadata pool using the second metadata includes adding the second metadata to the metadata pool having the first metadata.

12. The system of claim 10, wherein the building of the metadata pool using the second metadata includes replacing the first metadata in the metadata pool having the first metadata with the second metadata.

13. The system of claim 10, wherein the identification of the first content object in the dataset using the first search keyword includes text matching the first search keyword to the first metadata associated with the first content object.

14. The system of claim 10, wherein the building of the metadata pool comprises generating a string of data associated with the first content object.

15. The system of claim 10, wherein the building of the metadata pool comprises building a keyword pool based on a preference of the user.

16. The system of claim 15, wherein the selection of the second search keyword comprises making a random selection of the second search keyword from the keyword pool.

17. The system of claim 10, wherein the selection of the second search keyword comprises making a random selection of the second search keyword from the metadata pool.

18. The method of claim 1, wherein the first metadata are about the first audiovisual portion of the first content object, including at least one of a show description, an airdate and a television rating.

* * * * *